May 30, 1972  S. A. ROSEN  3,666,610
GRILLE CLOTH ASSEMBLY
Filed June 3, 1969
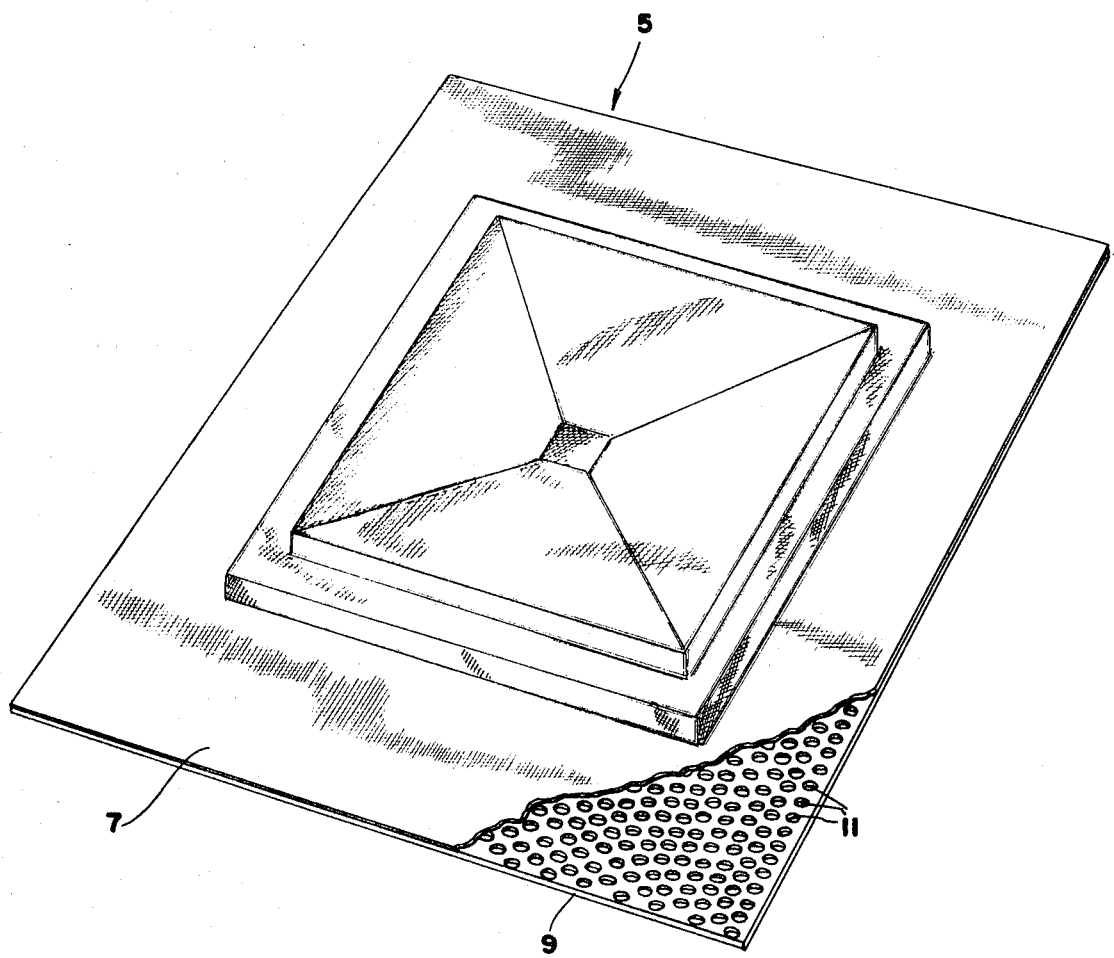
INVENTOR
SOL A. ROSEN
ATTYS.

United States Patent Office 3,666,610
Patented May 30, 1972

3,666,610
GRILLE CLOTH ASSEMBLY
Sol A. Rosen, Highland Park, Ill., assignor to Assembly Cloth Company, Chicago, Ill.
Filed June 3, 1969, Ser. No. 829,904
Int. Cl. B32b 3/10, 3/26
U.S. Cl. 161—113                                    2 Claims

ABSTRACT OF THE DISCLOSURE

A three dimensional acoustical grille cloth assembly is described comprising a shape retaining backing sheet with a decorative grille cloth front portion bonded thereto. A preferred method of forming the three dimensional grille cloth assembly by hot pressing a laminated thermoplastic backing sheet and decorative front grille cloth portion is also described.

---

The present invention generally relates to an acoustical grille cloth assembly, and more particularly relates to a three dimensional acoustical grille cloth assembly and to a method of fabricating the same.

Acoustical grille cloth or fabrics are usually made of selected materials and in specified manners such that the grille cloths do not substantially interfere with or impair the sounds emanating from the speakers which they cover, that is, they have suitable acoustical properties. Acoustical grille cloths are conventionally fabricated of selected metallic, plastic and/or other synthetic and natural fibers. Since acoustical grille cloths are not self-supporting as fabricated they do not lend themselves to deeply structural three dimensional decorative treatments or designs.

Acoustical grille cloths currently have wide application in radios, television sets, phonograph record players, wire recorders, electric guitar amplifiers, organs, loud speaker enclosures, and similar apparatus. Conventionally, grille cloths are utilized to cover the opening in the set in which the speaker for the radio, television, record player or other set is disposed so as to conceal the speaker and, accordingly, increase the attractiveness and decorativeness of the set. Usually, the grille cloth is stretched tightly across the opening of the set in a single plane, securely fixed in place by connection with a wooden frame which also supports the speaker.

A grille cloth assembly formed in accordance with the present invention is highly decorative. It can be provided in any desired size and three-dimensional shape and will impart a distinctive appearance to the set in which it is used, adding a richness, quality and depth thereto not previously obtained with grille cloths. Moreover, the improved novel appearance and three-dimensional stability can be provided without subjecting the grille cloth assembly to expensive, time-consuming operations. In addition, any fabric which has the requisite acoustical properties may be utilized as the grille cloth.

Accordingly, it is the principal object of the present invention to provide an improved acoustical grille cloth assembly having a three-dimensional appearance. It is a further object of the present invention to provide an improved method for the manufacture of an acoustical grille cloth assembly having a three-dimensional appearance. It is also an object of the present invention to provide an acoustical grille cloth assembly having a permanently shaped pattern imparted thereto and substantially unimpaired acoustical properties.

A further object of the present invention is to provide an acoustical grille cloth assembly having a three-dimensional shape which is able to span large expanses of unsupported speaker openings and which will not sag or otherwise become distorted under normal temperature and/or humidity changes.

Further objects and advantages of the present invention will be apparent from a study of the following detailed description and the accompanying drawing of which:

The single figure is a perspective view of one embodiment of a grille cloth assembly formed in accordance with the present invention, portions being broken away to show the internal construction thereof.

The present invention is directed to an improved self-supporting acoustical grille cloth assembly having a three-dimensional appearance. The improved grille cloth assembly comprises a front decorative acoustical grille cloth portion and a shape-retaining backing portion having suitable acoustical properties joined firmly to the front portion. The invention also extends to the method of fabricating the grille cloth assembly of the present invention.

Now referring more particularly to the single figure of the accompanying drawing, the figure illustrates an embodiment of the acoustical grille cloth assembly and its three-dimensional effect. The illustrated grille cloth assembly 5 is particularly suitable for uses such as a radio grille, television grille, record player grille, amplifier grille, and loud speaker grille. The grille cloth assembly 5 is self-supporting and therefore has the property of retaining its three-dimensional effect, it does not distort under adverse weather conditions and it has all the highly desirable acoustical properties normally associated with grille cloths.

As illustrated in FIG. 1, the grille cloth assembly 5 includes a decorative front portion 7 which faces outwardly of the radio, photograph, loud speaker enclosure or other unit in which it is installed. The front portion 7 of the grille is firmly bonded to a shape imparting and retaining portion 9. The decorative front portion 7 is fabricated from any suitable acoustical grille cloth, such as a conventional decorative grille cloth containing metal, plastic or textiles, or a mixture thereof, as may be seen in conventional radios, television sets, phonographs, loud speakers, and the like. At any rate, the portion 7 must have sufficient satisfactory acoustical properties to meet conventional requirements for radios, television sets, phonograph record players and loud speakers. Moreover, portion 7 must also be capable of being readily and permanently bonded to the backing portion 9 of the assembly. As an example, the front portion 7 may comprise a conventional radio grille cloth fabricated of a mixture of natural (cotton) and synthetic (rayon and plastic) fibers containing a small portion of metallic fibers in a loose decorative weave to allow the relatively free transfer of sound therethrough without substantial impairment of the tonal qualities or volume by inhibiting or muffling the transmission of sound.

The backing portion 9 is of one piece construction and may be fabricated of any suitable stiffening material which is shapable by heat and/or pressure, has the requisite acoustical properties and is of sufficient weight, thickness and rigidity to retain its form after a shaping operation and to impart its shape to portion 7 of the assembly. For example, such plastics as polystyrene, polyvinyl, acetate, butyrates, polyethylene, polypropylene, vinyl chlorides, polyisobutylene, and other heat deformable materials may be utilized in the fabrication of the backing portion 9 of the grille cloth construction. As an example, the backing portion 9 may be fabricated from polystyrene sheet material approximately 1/32 of an inch thick, which material is sufficiently rigid to form with the front portion 7 a self-supporting grille cloth assembly. Moreover, it is relatively light weight and readily heat deformable for ease of conversion to the desired form and shape for use. It should be understood that although certain other selected types of materials may be suitable in the fabrication of the backing portion 9, plastics, particularly thermoplastics, are generally preferred because of their low cost, light weight, ease of fabrication and perforation and acoustical properties, as well as their appearance and form retaining characteristics.

In accordance with the method of the present invention, the backing portion 9 is fabricated by first subjecting the selected sheet of plastic or other material to a perforating operation, which imparts acoustical properties to such sheet by providing a plurality of passageways for unimpeded sound transmission through the sheet. In this connection, a stamping, cutting or punching operation can be readily carried out in any suitable conventional apparatus, for example, a punch press, to perforate the sheet.

The plurality of holes 11 illustrated in the single figure and which are formed in the sheet comprising backing portion 9, as described, extend through the portion 9 and are preferably substantially uniformly distributed therein. For practical purposes, the areas of the holes should represent a substantial proportion of the total area of the portion 9, at least about 40 percent of the total area of the portion 9, and preferably 50 percent or more of the total area of the portion 9. The holes facilitate the transfer of sound through the grille cloth assembly. The perforations also have the effect of substantially increasing the deformability of the plastic sheet at a given temperature while minimizing the stress to which the sheet must be subjected during a subsequent forming operation. In this connection, it is believed that the pathways which are provided and delineated in the sheet by the perforating operations permit substantially uniform transfer of stress throughout the sheet during the subsequent shaping and forming operation. Accordingly, the step of producing a plurality of holes 11 substantially uniformly spaced in the portion 9 apparently has the effect of increasing the acoustical transmission properties of portion 9 and also improving the shaping and forming properties thereof, while substantially retaining the stretchability and strength characteristics of the material utilized for the fabrication of backing portion 9.

After the sheet forming the backing portion 9 has been perforated it is bonded to the decorative front cloth portion 7 by means of a suitable glue or adhesive. For example, when the backing portion is formed of a high impact polystyrene, one can use a water soluble pressure sensitive adhesive rubber base adhesive as the bonding agent. A bonding means and method is utilized which will not tend to block the apertures 11 in the perforated sheet and thereby interfere with the acoustical properties of the grille cloth assembly 5. It is generally preferred to dispose a thin film of the adhesive on the sheet or backing portion 9, being careful not to spread the adhesive acros the apertures 11. The front grille cloth portion 7 can then be applied to the adhesive treated surface of sheet 9 and firmly pressed thereto so as to form the bonded grille cloth assembly 5.

In accordance with the present invention, the laminated grille cloth assembly, formed of perforated sheet 9 with the decorative cloth portion 7 attached thereto is shaped and formed into the desired finished three-dimensional form. If the backing portion 9 is heat deformable the laminated grille cloth assembly may be heated and suitably formed under pressure in a contoured die to provide the desired design or pattern to the grille cloth assembly 5. In this connection, any suitable shape may be imparted to the grille cloth assembly 5. For example, the grille cloth assembly may be formed into the stepped contoured shape illustrated in the accompanying drawing, said contoured shaped including a flat planar border section and outwardly projecting sections joined in intersecting planes and at plural corners. Other suitable shapes will be obvious to those skilled in the art. The materials selected for the backing sheet 9 and decorative front portion 7 are such that the grille 5 may be formed into the desired shape without the production of undue stress or strain in the sheet 9 or decorative front portion and without ripping the grille 5 or unduly stretching and weakening it. In this connection all of the decorative grille cloth fabrics used for the front portion 7 are stretchable to some extent. However, if the final grille cloth design is such that the assembly will be subjected to extensive stretching during the forming operation, the front portion 7 is formed of a highly stretchable fabric such as a knit fabric.

The forming method will, of course, depend upon the characteristics of the particular material utilized for the backing portion 9. It is generally preferred to utilize a thermoplastic sheet as portion 9 and to carry out the shaping operations in accordance with a suitable molding method for plastics, such as pressure forming or a conventional vacuum forming technique. The temperature and pressure of operation will, of course, depend upon the particular type of plastic utilized, the thickness of the plastic, etc. Various pressure forming and vacuum forming techniques are well known in the art therefor, and will not be described in further detail.

Once the front grille cloth portion 7 and the perforated backing sheet portion 9 have been firmly joined together, and the laminated assembly formed into the desired three-dimensional pattern the construction is complete and ready for use. A sufficiently strong self-supporting sheet 9 may be utilized in the improved grille cloth construction of the present invention so that, if desired, the usual wood or other supporting frame or web need not be used as a backing for the grille cloth assembly when the assembly is in place over a speaker or the like. Instead, the self-supporting properties of the grille cloth assembly may be utilized to maintain the grille cloth assembly in position in front of the speaker. However, in practice a web or frame of wood or similar material is usually provided in the set to fix the speaker in position. Accordingly, the grille cloth assembly of the present inveniton will usually still be backed by such frame and may be connected thereto, if desired. At any rate, the increased rigidity afforded by the improved grille cloth assembly of the present invention has the advantage of eliminating grille cloth sag commonly encountered in conventional grille cloths susceptible to sag or dishing over speaker openings during periods of high atmospheric moisture. Moreover, the manner of assembling the grille cloth assembly of the present invention in a phonograph or television set, etc., is simplified in comparison with the assembly of conventional grille cloths, inasmuch as tight stretching of the grille cloth over the wooden backing web or frame is eliminated and the grille cloth assembly can be preformed to size and be ready for assembly exclusive of the wooden backing frame, if desired. Further, the three-dimensional shape of the grille cloth assembly provides a greatly improved appearance to the unit on which it is utilized.

The method of making the grille cloth assembly of the present invention is such as to provide a highly commercially advantageous product of improved shape, three-dimensional appearance, stability and low cost. Other advantages and distinctive features of the invention are set forth in the foregoing.

Such modifications in the improved grille cloth assembly of the present invention and in the method of making the same, including the steps and the materials for carrying out the steps, as are within the skill of those versed in the art, are contemplated as being within the scope of the present invention.

Various of the features of the invention are set forth in the claims which follow.

What is claimed is:

1. An improved acoustical grille cloth assembly comprising, in combination, a one-piece shape-retaining and shape-imparting, self-supporting rigid backing sheet portion of substantially uniform cross-sectional thickness and having a plurality of sound transmitting passageways therethrough, and a non-self-sustaining front decorative acoustical grille cloth portion adapted to allow the transfer of sound therethrough without substantial impairment of tonal qualities or volume, said grille cloth portion being firmly bonded to said backing sheet portion, said backing sheet portion being formed of heat deformable material, said grille cloth portion and said backing sheet portion having been molded simultaneously in a substantially non-planar configuration with a flat planar border section and with sections projecting outwardly from said planar border section and joined in intersecting planes and at plural corners thereby defining a substantially out of planar configuration and a three-dimensional grille cloth assembly, said grille cloth portion being positioned in said corners and said out of planar configuration and being adhesively bonded to said backing sheet portion and thereby secured against sagging, and sound transmitting passageways having an aggregate cross-sectional area equal to at least about 40 percent of the total area of said backing sheet portion and distributed substantially uniformly to aid in freeing said backing sheet of stresses and providing transfer of sound therethrough whereby an improved grille cloth assembly of enhanced physical appearance is provided.

2. An improved acoustical grille cloth assembly as set forth in claim 1 wherein said intersecting planes comprise an outer peripheral planar portion and an inner, stepped-contoured portion projecting from said planar portion and jointed thereto at corners.

References Cited

UNITED STATES PATENTS

| | | | |
|---|---|---|---|
| 1,912,161 | 5/1933 | Rosenblatt | 52—145 |
| 2,107,757 | 2/1938 | Kinsley | 181—32 X |
| 2,310,154 | 2/1943 | Schlenker | 52—145 X |
| 3,072,512 | 1/1963 | Dalle | 161—150 X |
| 2,520,222 | 8/1950 | Stone | 161—123 UX |
| 3,252,181 | 5/1966 | Hureau | 264—167 |
| 3,472,723 | 10/1969 | Lemelson | 156—500 |

JOHN T. GOOLKASIAN, Primary Examiner

W. E. HOAG, Assistant Examiner

U.S. Cl. X.R.

52—144, 309, 673; 156—224; 161—125; 181—31, 32